(12) United States Patent
Williams, IV (10) Patent No.: US 10,878,455 B2
(45) Date of Patent: Dec. 29, 2020

(54) ENHANCING MARKETING EFFORTS BY ASSOCIATING LOCATIONS, MEDIA, OR OTHER INFORMATION WITH A CODED, GEOTAGGED ICON

(71) Applicant: Theodore Maurice Williams, IV, Forest, VA (US)

(72) Inventor: Theodore Maurice Williams, IV, Forest, VA (US)

(*) Notice: Subject to any disclaimer, the term of this patent is extended or adjusted under 35 U.S.C. 154(b) by 551 days.

(21) Appl. No.: 15/670,670

(22) Filed: Aug. 7, 2017

(65) Prior Publication Data

US 2018/0040024 A1 Feb. 8, 2018

Related U.S. Application Data

(60) Provisional application No. 62/371,992, filed on Aug. 8, 2016.

(51) Int. Cl.
*G06Q 30/02* (2012.01)
*H04L 12/58* (2006.01)
*H04W 4/021* (2018.01)
*G06F 16/44* (2019.01)
*G06F 16/487* (2019.01)
*G06F 16/9535* (2019.01)
*G06F 16/29* (2019.01)

(52) U.S. Cl.
CPC ......... *G06Q 30/0261* (2013.01); *G06F 16/29* (2019.01); *G06F 16/444* (2019.01); *G06F 16/487* (2019.01); *G06F 16/9535* (2019.01); *H04L 51/20* (2013.01); *H04W 4/021* (2013.01); *H04L 51/10* (2013.01)

(58) Field of Classification Search
None
See application file for complete search history.

(56) References Cited

U.S. PATENT DOCUMENTS

| | | | |
|---|---|---|---|
| 2010/0088631 A1* | 4/2010 | Schiller | G06F 3/0481 715/784 |
| 2012/0088487 A1* | 4/2012 | Khan | H04W 4/021 455/418 |
| 2013/0322665 A1* | 12/2013 | Bennett | G08G 1/096855 381/300 |
| 2014/0336920 A1* | 11/2014 | Burrell | G01C 21/206 701/409 |

* cited by examiner

Primary Examiner — Sam Refai
(74) Attorney, Agent, or Firm — Standley Law Group, LLP; Jeffrey Standley; Adam Smith (57) ABSTRACT

A system and method for enhancing marketing efforts uses a plurality of advertising media objects, each having a geotagged coded icon located thereon. A remotely located server stores data associated with each of the geotagged coded icons. A personal electronic device in communication with the server comprises executable software that displays representations of one or more of the coded icons on a map at their respective location, selectively filters the displayed representations, and retrieves data associated with selected displayed coded icon(s).

14 Claims, 8 Drawing Sheets

ENHANCING MARKETING EFFORTS BY ASSOCIATING LOCATIONS, MEDIA, OR OTHER INFORMATION WITH A CODED, GEOTAGGED ICON

CROSS-REFERENCE TO RELATED APPLICATION

This application claims the benefit of U.S. Provisional Patent Application No. 62/371,992 filed Aug. 8, 2016, the disclosures of which are hereby incorporated by reference in their entirety.

TECHNICAL FIELD

Exemplary embodiments of the present invention relate generally to an apparatus, system, and method for marketing.

BACKGROUND AND SUMMARY OF THE INVENTION

Marketing has long been used to drive sales. Historically, many marketing campaigns have been accomplished by the use of physical media, such as but not limited to, billboards, real estate signs, and coupons for local stores and restaurants. With the increase of digital technology, some marketing campaigns have shifted to or otherwise begun to incorporate digital media. Even with the rise of digital media, physical media remains an important part of marketing campaigns. Effectively integrating both physical and digital media has been challenging. However, effective integration is required to capture the widest potential customer base—both those who are accustomed to physical media and those who are accustomed to digital media.

The following examples are illustrative but are not intended to be limiting. Billboards are becoming less effective in the digital age where passengers are more interested in digital devices and drivers are more distracted than ever. Even if a driver wants to remember a billboard, it is likely that he/she will subsequently forget, which renders advertising efforts less effective. Regarding real estate (a.k.a. "for sale") signs, information flyers are often depleted, or people are unable/unwilling to stop to look more closely at a home that is for sale. Similarly, coupons for local stores and restaurants are becoming obsolete in a digital world and the method of selling "coupon books" for towns (especially for tourism) is changing. People are much more dependent on local reviews from reliable internet sources. Many will not even enter an unfamiliar establishment if they do not know what is inside the shop.

Digital technology can be used to provide additional information (whether marketing information or otherwise) about a physical object such as, but not limited to, a location, building, object, company, or the like. However, effectively linking digital technology with the physical object can be difficult and cumbersome. As another example, a user may wish to know more about a particular landmark and its history. Therefore, what is needed is an apparatus, system, and method for effectively integrating physical and digital advertising media, as well as physical objects with digital information.

The present invention is an apparatus, system, and method for effectively integrating physical and digital advertising media, as well as physical objects with digital information. The present invention may comprise a coded icon associated with a physical advertising media or a physical object. The coded icon may be associated with digital media or other information and a geographically tagged location of the physical advertising media or the physical object. The icon may be linked with the digital media by way of a smartphone or other personal electronic device. For example, the smartphone or other personal electronic device may have software or application (hereinafter the "app") installed thereon that allows the user to filter and display the coded icons selected by the user. As the icons are also geographically tagged, this may limit the number of displayed icons such that permit the user to recall and select the desired icon. The app may retrieve and display associated digital media such as, but not limited to, an audio clip, video clip, photo, or the like.

Alternatively, or in the addition, the icon may be a device, such as an electronic chip, capable of transmitting information. The transmitted information may include, but is not limited to, location or other digital information. The information may be transmitted wirelessly or by wired connection or by any known means.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
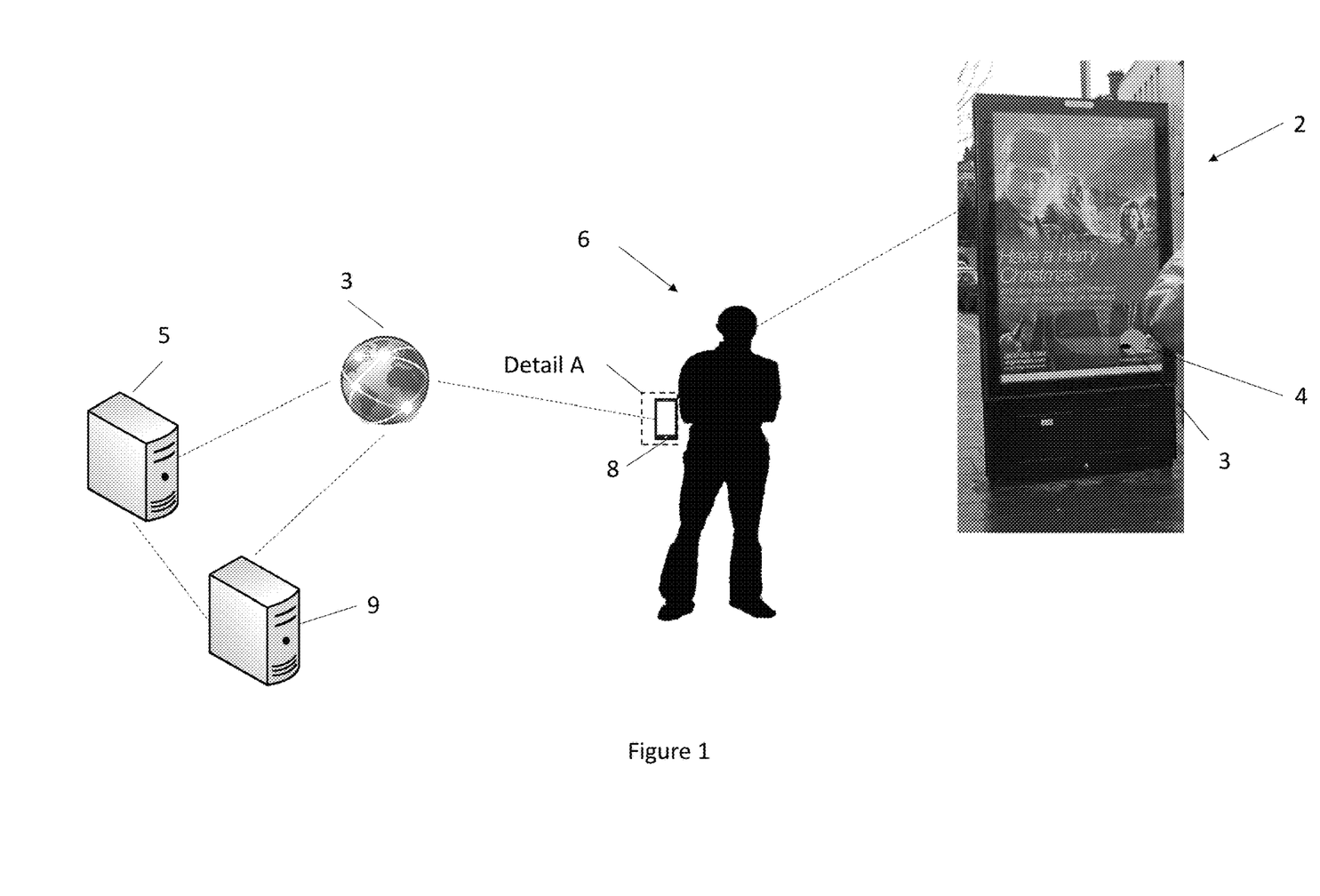
FIG. 1 is a plan view of an exemplary system consistent with the present invention.

FIG. 1 is a plan view of an exemplary system consistent with the present invention. The system may comprise a coded icon 4 that may be associated with a physical advertising media 2. Alternatively, the coded icon 4 may be associated with a physical object 18. It is notable that any of the embodiments shown or described herein may be used with either a physical advertising media 2 or a physical object 18, even if discussed with respect to either one. The icon 4 may be a dot or other symbol such as a triangle, square, number, squiggle, series of dots, or the like. Any shape or type of symbol is contemplated. The icon 4 may be coded by color, number, letter, pattern, shape, or the like. Any type of color, number, letter, pattern, shape, or other coding is contemplated. For example, without limitation, the icon 4 may be placed on a corner or near the location of the physical advertising media 2, though any location is contemplated. In exemplary embodiments of the present invention, the icon 4 may be selected to correspond with the physical object 18 or the physical advertising media 2. For example, but not to serve as a limitation, all barbershops may be associated with a red and white stripe barber's pole and/or a bank may be represented by a green cash symbol ($). These are merely exemplary and are not intended to by limiting. Any style icon 4 may be used consistently or inconsistently with any physical advertising media 2 or physical object 18.

The physical advertising media 2 may include, but is not limited to, billboards, real estate signs, coupons, posters, other signage, pictures, graphics, leaflets, flyers, posters, papers, book, and the like. Any and all types of physical advertising media 2 are contemplated. The physical object 18 may include, but is not limited to, a location, building, object, landmark, placard, artwork, sign, company, building, sign, storefront, or the like. Any and all types of physical objects 18 are contemplated.

The icon 4 may be associated with a digital media item 10 and a geographical location of the physical advertising media 2. The physical advertising media 2 or the digital media item 10 may be associated with a consumer good or service. As will be explained in greater detail with regards to subsequent figures, the present invention may further comprise a smartphone or other personal electronic device 8 having an application 14 (hereinafter also the "app 14") or other executable software instructions installed thereon. The app 14 may be configured to permit a user 6 to view representations of the icons 4 at their respective locations on a map 12.

The app 14 may interact with and store information on a remote server 5 or database. The server 5 may be accessed through a network 7 such as, but not limited to, an internet, intranet, the world wide web, or the like. The information stored on the server 5 may include, but is not limited to, the geographic locations of the icons 4, the map 12 information, the associated digital media item 10 and any other information required to operate the app 14.

Alternatively, or in addition, the icon 4 may comprise an electronic component 3 capable of storing, retrieving, and/or transmitting information. This may be, for example without limitation, a processor, microchip, electronic storage device, computer, some combination thereof, or the like. The transmitted information may include, but is not limited to, location data or other additional information regarding the associated physical advertising media 2, physical object 18, the digital media item 10, or the consumer goods, services, or other objects or items associated with the physical advertising media 2 or physical object 18. The information may be transmitted wirelessly by any known means such as Bluetooth, Wi-Fi, near field communication, or the like. Alternatively, wired communication is contemplated. The electronic component 3 may be configured to access or retrieve global positioning satellite (GPS) or other location data, which may determine and store the approximate location coordinates of the icon 4. The electronic component 3 may also be configured to access the remote server 5 by way of the network 7, such that additional information about the respective physical advertising media 2 or physical object 18 may be retrieved. Alternatively, or in addition the electronic component 3 may be pre-loaded with location data and/or the additional information.

For example, a food truck may have the coded icon 4 located thereon and the coded icon 4 may further comprise the electronic component 3. If the user 6 wishes to get more information about the food truck, including its current location, the user 6 may find the coded icon 4 using the app 14 and receive the food truck's current location. Again, this is merely an example and is not intended to be limiting.

In exemplary embodiments, the server 5 may be in communication with an analytics engine 9. The analytics engine 9 may be configured to retrieve, store, analyze, and transmit data associated with the app 14. The analytics engine 9 may be separate from the server 5, alternatively, the server 5 may comprise the analytics engine 9. As another example, without limitation, the analytics engine 9 may be in communication with the network 7. For example, without limitation, the app 14 may be configured to permit users to like, dislike, rate, check-in, comment on, review, or otherwise provide feedback for or other data regarding their experience with the physical object 18, the advertising media 2, the associated digital media item 10, or the object, consumer good, service, or other item the physical object 18 or the advertising media 2 are referring to. For example, without limitation, if the advertising media 2 or physical object 18 is associated with a movie, the users may be permitted to provide feedback regarding the movie. As another example, again without limitation, if the advertising media 2 or physical object 18 is associated with a restaurant, the users may be permitted to provide feedback regarding the restaurant.

The analytics engine 9 may receive, store, analyze, and periodically transmit this feedback data or other data. For example, without limitation, the analytics engine 9 may be capable of determining, based at least in part on the feedback data, which advertising media 2 or physical object 18 in an area is most utilized, most liked, best reviewed, has the best coupons, and the like. The app 14 may be configured to display this information.

The information from the analytics engine 9 may be accessed remotely from the app 14 prior to visiting a particular area or particular location associated with the advertising media 2 or physical object 18 for planning or other purposes. For example, without limitation, if the user plans to visit a certain part of Chicago, the user may use the app 14 to locate restaurants near the user's hotel in Chicago. Likewise, the information from the analytics engine 9 may be accessed remotely from the app 14 prior to consuming a good or service associated with the advertising media 2 or physical object 18 for planning or other purposes. For example, without limitation, if the user plans to see a movie being advertised by the advertising media 2 or physical object 18, the user may use the app 14 to read reviews about the movie associated with advertising media 2 or physical object 18.

Similarly, the information from the analytics engine 9 may be utilized by business owners for competitive analysis and other purposes. For example, without limitation, business owners may view which competing businesses in the near vicinity are receiving good or bad reviews, the most or fewest likes, the most or fewest check-ins, what coupons or specials they are offering, and the like.

Figure 2A:
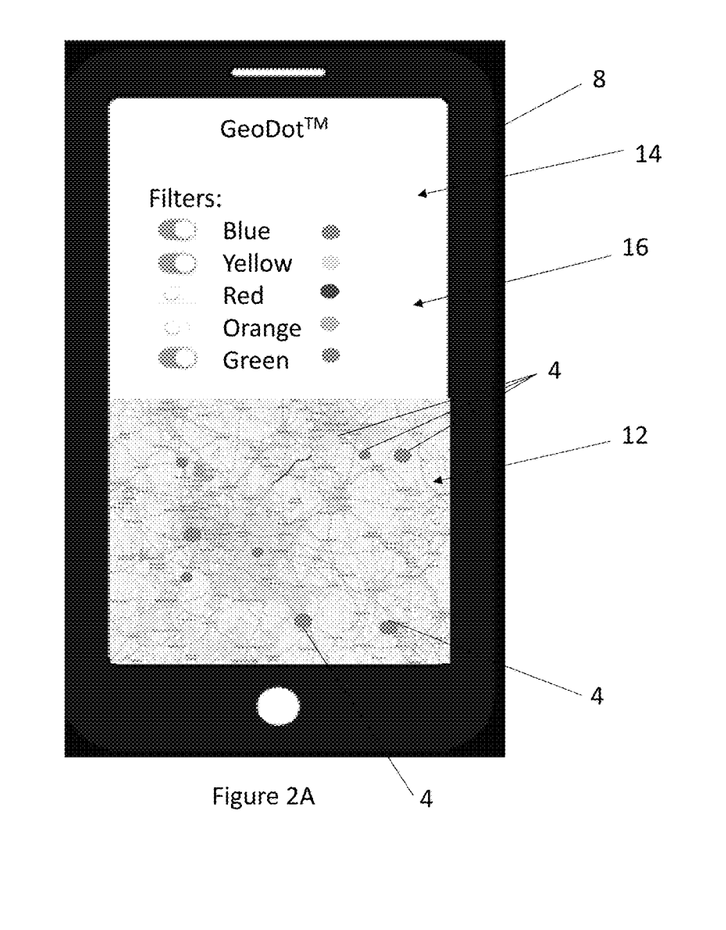
FIG. 2A is an exemplary detailed view of a mobile device for use with the system of FIG. 1.
Figure 2B:
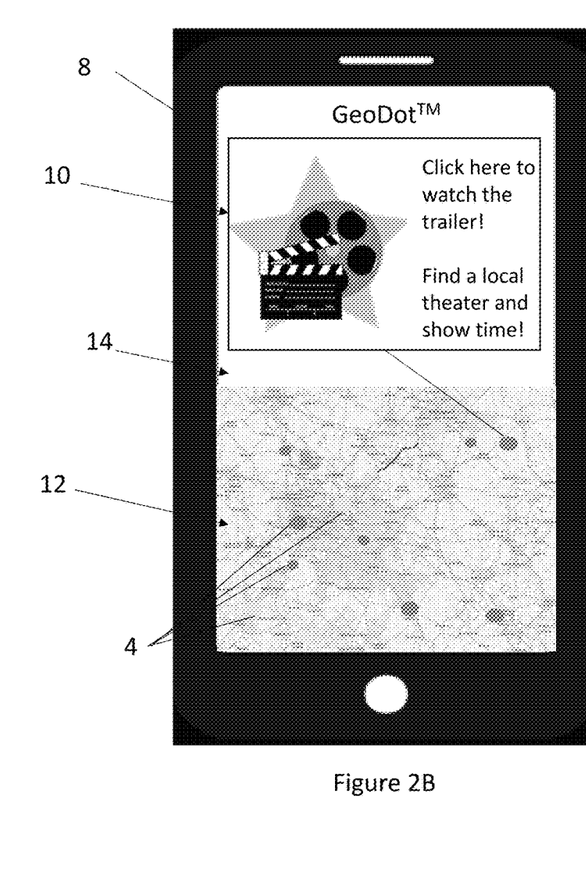
FIG. 2B is another exemplary detailed view of a mobile device for use with system of FIG. 1.

FIG. 2A and FIG. 2B illustrate an exemplary enlarged, plan view of Detail A of FIG. 1. For example, but not to serve as a limitation, the icons 4 may be displayed on a map 12 corresponding to the geographic location of the physical advertising media 2. The app 14 may be configured to permit the user 6 to filter and display the coded icons 4 as selected by the user 6 by a filter selection tool 16. Additionally, the app 14 may permit the user 6 to mark their geographic location when they viewed physical advertising media 2 of interest. This may assist the user 6 in recalling their geographic location and finding the associated icon 4 at a later time. Such marking may be performed, for example but without limitation, manually, in response to touch input, or in response to voice commands.

In exemplary embodiments of the present invention, the filter section tool 16 is a series of interactive indicia corresponding to the coding of the icons 4 any may permit the user 6 to filter out all icons 4 except those desired by the user 6. In other exemplary embodiments of the present invention, the filter section tool 16 may comprise voice recognition technology such that the user 6 may speak a description of the coded icon 4 to filter out icons 4 not matching the desired code. For example, but not to serve as a limitation, the user 6 may speak "blue dot", and the app 14 may display only blue dots. Further still, the voice recognition technology may be used to mark the user's 6 geographic location. For example, but not to serve as a limitation, the user 6 may speak "blue dot" to mark their geographic location and note a reminder that the user 6 viewed a blue dot icon 4 at this geographic location. In some instances, particularly when there are only a limited number of the particular coded icons 4 in close proximity, the app 14 may automatically locate and select the closest blue dot icon 4. As the graphic or other design of the specific dots may represent certain types of locations, filters may also be utilized to display only certain location types, such as restaurants, landmarks, government buildings, banks, and the like.

As the icons 4 are geographically tagged, by showing only the user 6 selected coded icons 4, the remaining icons 4 displayed on the app 14 may be sufficiently limited such the user 6 may recall the geographic location of the physical advertising media 2 and select the appropriate icon 4. Upon selection of the appropriate icon 4, the app 14 may retrieve and display associated digital media item 10 such as, but not limited to, a written description, phone number, email address, website information, hyperlink, photo, logo, audio clip, video clip, any other information, some combination thereof, or the like. In exemplary embodiments of the present invention, the digital media item 10 may contain additional information about the location in question or contact information for learning more about the location.

Exemplary use cases of the present invention may include the following examples which help to illustrate the present invention. These examples are intended to be exemplary and are not intended to be limiting.

FIG. 1 through FIG. 2B illustrate use case #1—Posters. Market Problem: Posters are becoming less effective in the digital age, where pedestrians are focused on their electronic devices and little time is spent viewing their surroundings. Even if a pedestrian would like to get more information about a product or service, they may not have time in the moment to do so and may not remember the poster later. Solution: The user 6 may view a poster 2 advertising a movie. The poster 2 may have a green dot 4 located thereon. The user 6 may take mental note of the green dot 4. At a later time, the user 6 may use his or her personal electronic device 8 and open the app 14. The app 14 may display the map 12 with various icons 4 located thereon. The icons 4 may correspond to the geographic location of various physical advertising media 2 having coded icons 4 thereon, such as those utilizing the present invention. The user 6 may then use the filter selection tool 16 to show only the green coded icons 4. For example, but not to serve as a limitation, the user 6 may select only the green icons 4 from a series of slider switches. The user 6 may then find the green coded icon 4 associated with the geographic location the user 6 was at when viewing the poster 2. Upon selecting the appropriate green icon 4, an image of the movie's trailer may appear and invite the user 6 to view the trailer and/or find local theaters and show times for the movie.

Figure 3:
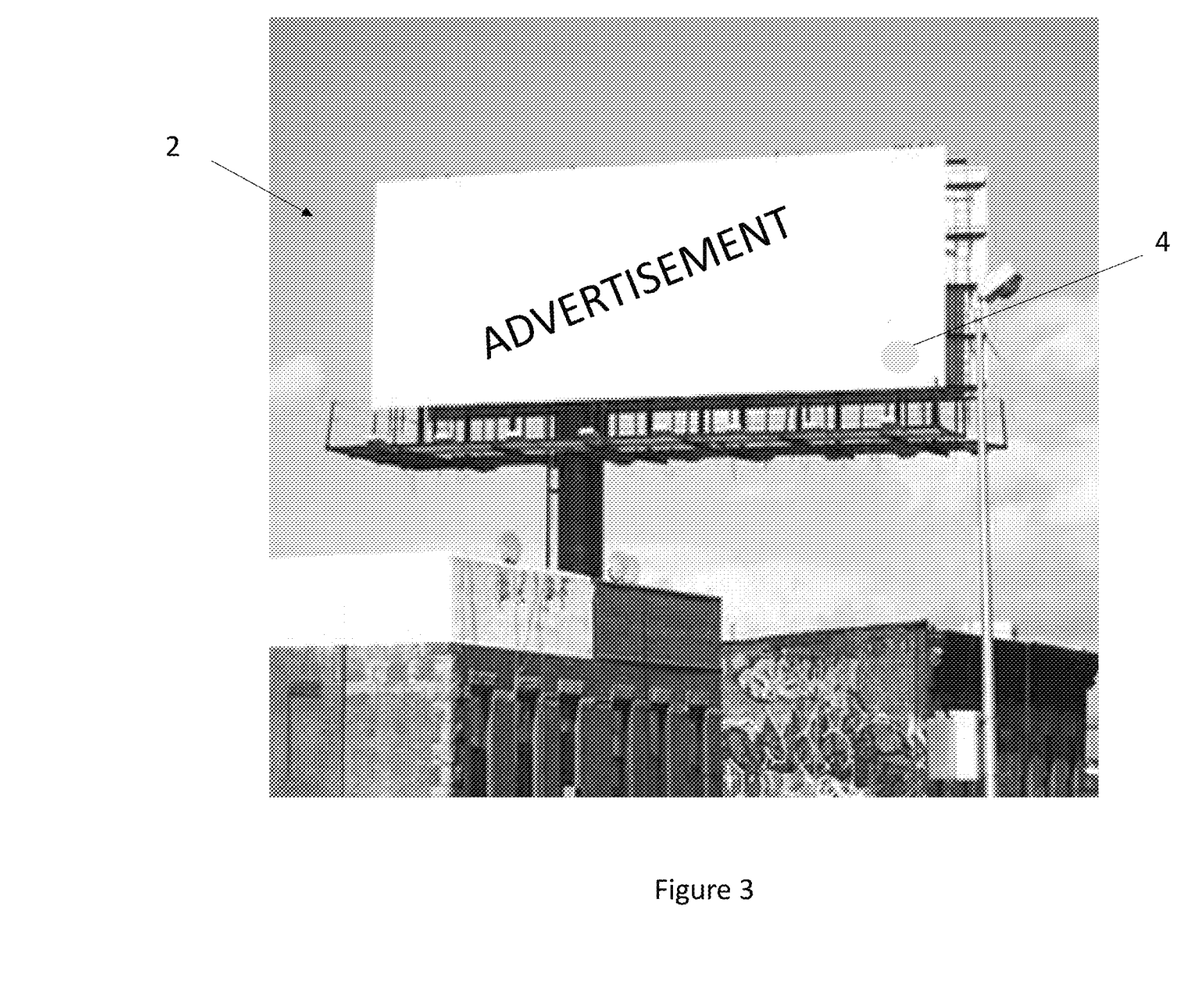
FIG. 3 is a perspective view of an exemplary physical advertising media consistent with the present invention.

FIG. 3 illustrates use case #2—Billboards. Market Problem: Billboards 2 are becoming less effective in the digital age, where passengers are more glued to digital devices and drivers are more distracted than ever. Even if a driver wants to remember a billboard, it is likely that he/she will subsequently forget, which renders advertising efforts less effective. Solution: With the present invention, a dot 4, such as but not limited to a yellow dot 4, is placed in a corner of the billboard 2. For example, without limitation, the dot 4 may be geographically tagged. Alternatively, the electronic component 3 may be pre-loaded with location data. The electronic component 3 may also be pre-loaded with additional information about the associated billboard 2. Users 6 who are within close proximity to the location may have multiple options to learn more about the billboard 2. For example, without limitation, the users 6 may open an app 14 and say "Yellow Dot," thereby causing the app 14 to mark the location of where the user 6 was at the approximate time that the user 6 saw the dot 4, and running a quick search to display yellow dots 4 in the immediate vicinity. In another exemplary mode, the app 14 plays a short audio clip 10 about the billboard 2 associated with the specific yellow dot 4. As another example, again without limitation, the user 6 may arrive at their destination at which point the user 6 may open the app 14 and zoom in on the map 12 to the approximate area where the user 6 was when they viewed the dot 4. Filtering by yellow dots 4, the user 6 is then able to quickly recall what the user 6 was interested in, and are able to obtain additional information.

Figure 4:
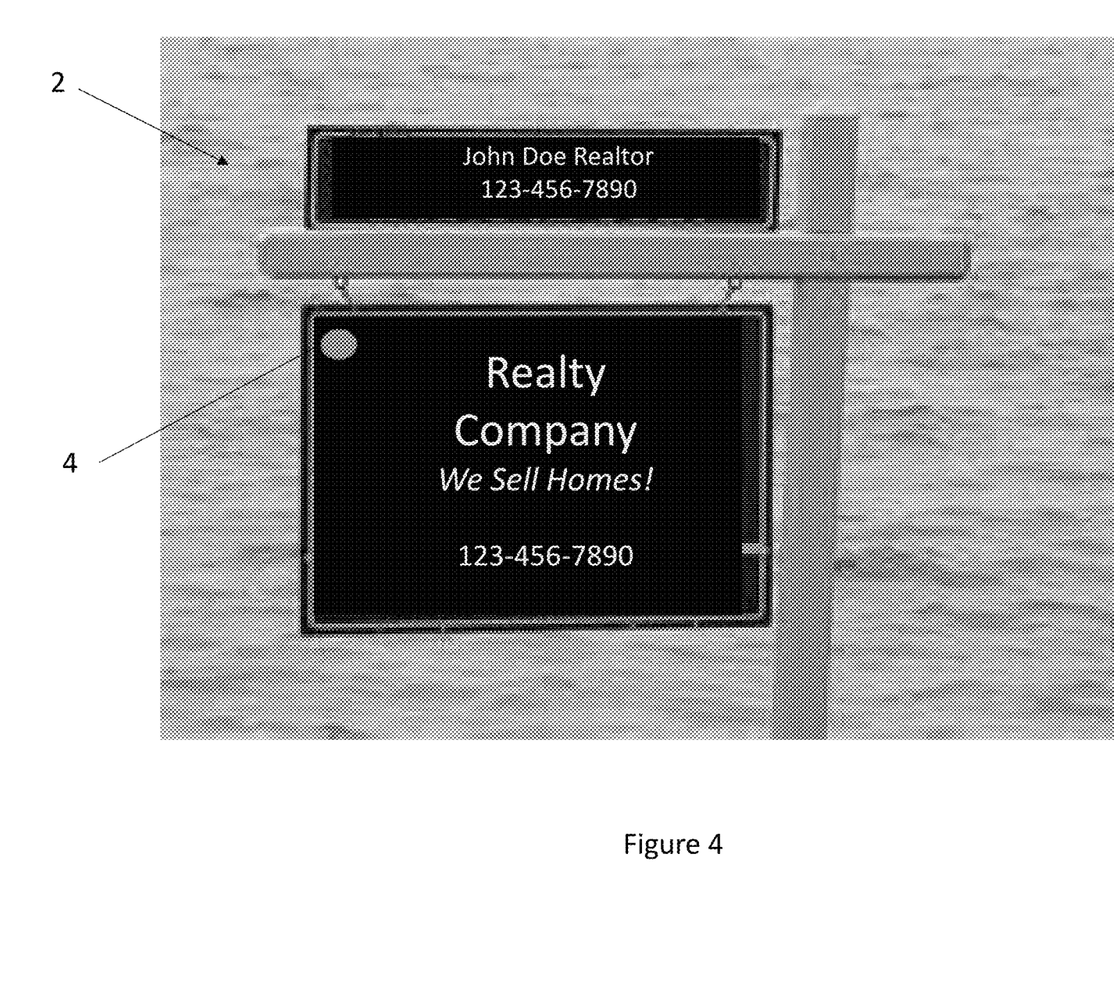
FIG. 4 is a perspective view of another exemplary physical advertising media.

FIGS. 4 illustrates use case #3—Real Estate. Market Problem: Information sheets or flyers are often depleted, or people are unable/unwilling to stop to look more closely at a home that is for sale. Solution: With the present invention, a dot 4, such as but not limited to a blue dot 4, is placed in a corner of the "For Sale" sign 2. The dot 4 may be geographically tagged, for example by use of the electronic component 3. Again, the user 6 may have multiple options to learn more about the home associated with the "For Sale" sign 2 that is for sale. As a first example, without limitation, the user 6 can open an app 14 and say "Blue Dot," marking the location of where they were at the time that the user 6 saw the dot 4, and running a quick search to display blue dots 4 in the immediate vicinity. In mobile mode, the app 14 plays a short audio clip 10 about the home associate with the specific blue dot 4. As a second example, again without limitation, the user 6 arrives at their destination at which point the user 6 may open the app 14 and zoom in on the map 12 to the approximate area where the user 6 was when the user 6 viewed the dot 4. Filtering homes by blue dots 4, the user 6 is able to quickly recall what the user 6 as interested in, and are able to obtain additional information.

Figure 5:
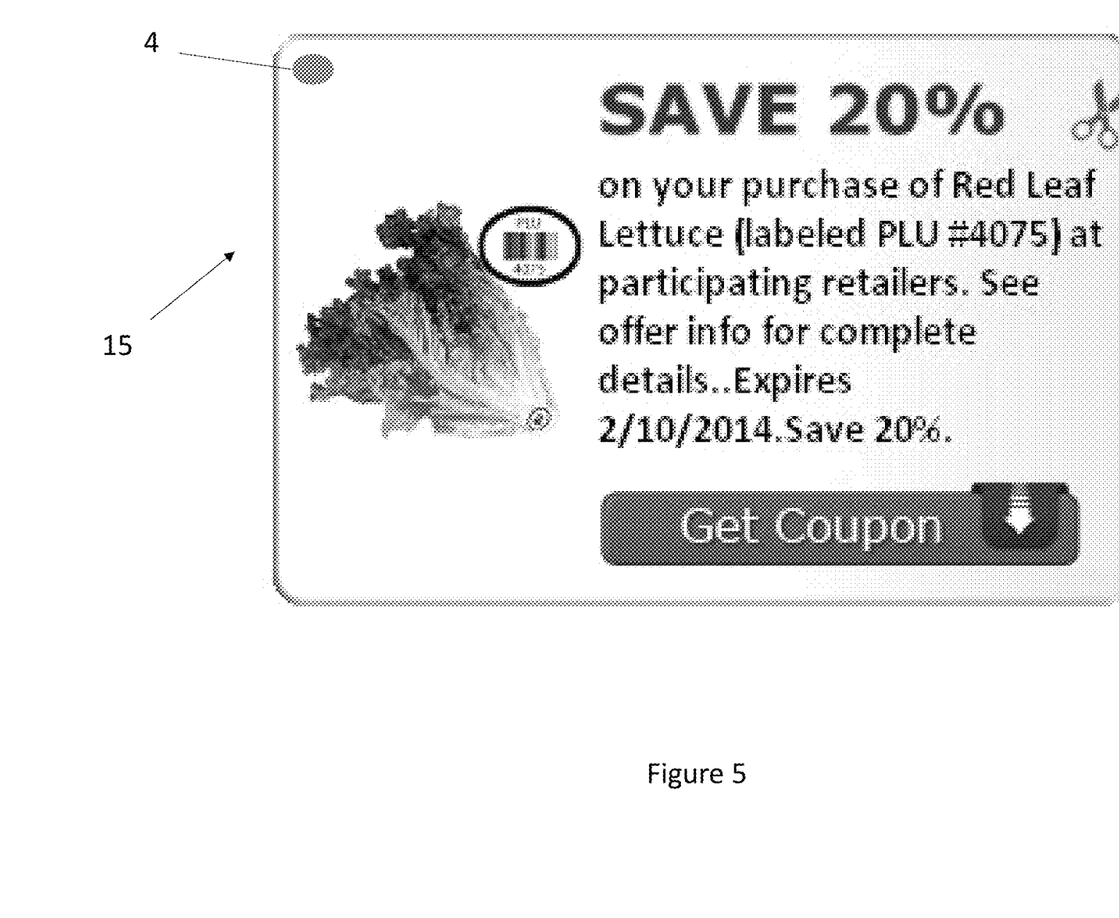
FIG. 5 is a plan view of another exemplary physical advertising media.
Figure 5B:
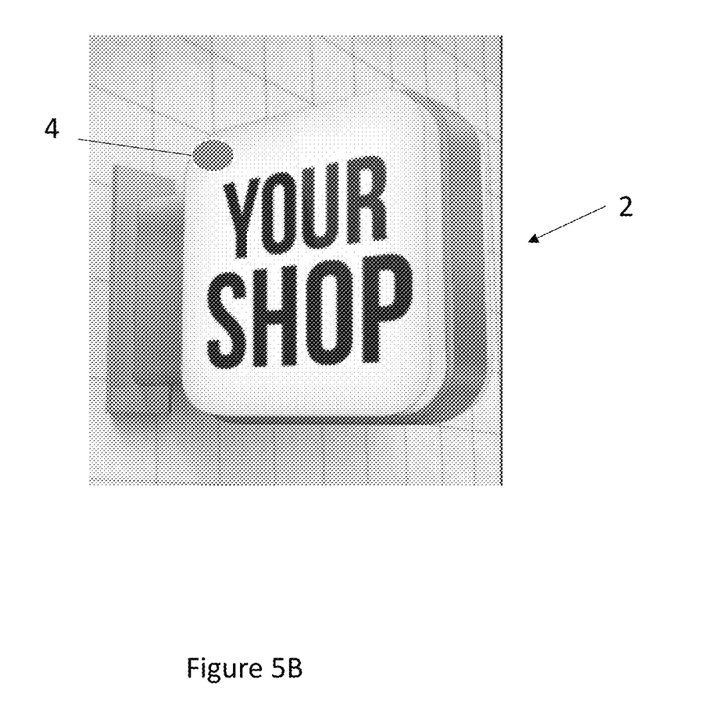
FIG. 5B is a plan view of another exemplary physical advertising media.

FIG. 5 and FIG. 5B illustrates use case #4—Coupons for local storefronts/restaurants. Market Problem: In a digital world, the method of "coupon books" for towns (especially for tourism) is changing. People are much more dependent on local reviews from reliable internet sources. Many will not even enter an unfamiliar establishment if they do not know what is inside the shop. Solution: With the present invention, a dot 4, such as but not limited to an orange dot 4, is placed on or near the store signage 2 or on a coupon 15. The dot 4 may be geographically tagged, for example by use of the electronic component 3. The user 6 will have multiple options to learn more about the associated business. As a first example, the user 6 may open the app 14 and say "Orange Dot," marking the user's 6 current approximate location. This may trigger the app 14 to automatically run a quick search to display orange dots 4 in the immediate vicinity. In another exemplary embodiment, the app 14 may automatically plays a short audio clip 10 about the business associated with the specific orange dot 4. In exemplary embodiments, after listening to the short audio clip 10 or otherwise viewing the advertising message, the user may gain access to a coupon 15. As another example, the user 6 may instead open the app 14 and zoom in on the map 12 to the approximate area where the user 6 was when they viewed the dot 4. Filtering businesses by orange dots 4 (and potentially other useful filters), the user 6 may be able to quickly review and recall what the user 6 was potentially interested in, and may be able to view associated information such as, but not limited to, menus, valuable coupons, or other helpful information. In an exemplary embodiment, selection of the representation on the map 14 of the store signage 2 or the store may bring up an advertising message for the store associated with the storefront signage 2. At some point during play of the advertising message, but preferably at the end thereof, the user may be presented with a coupon 15 for the particular store.

Figure 6:
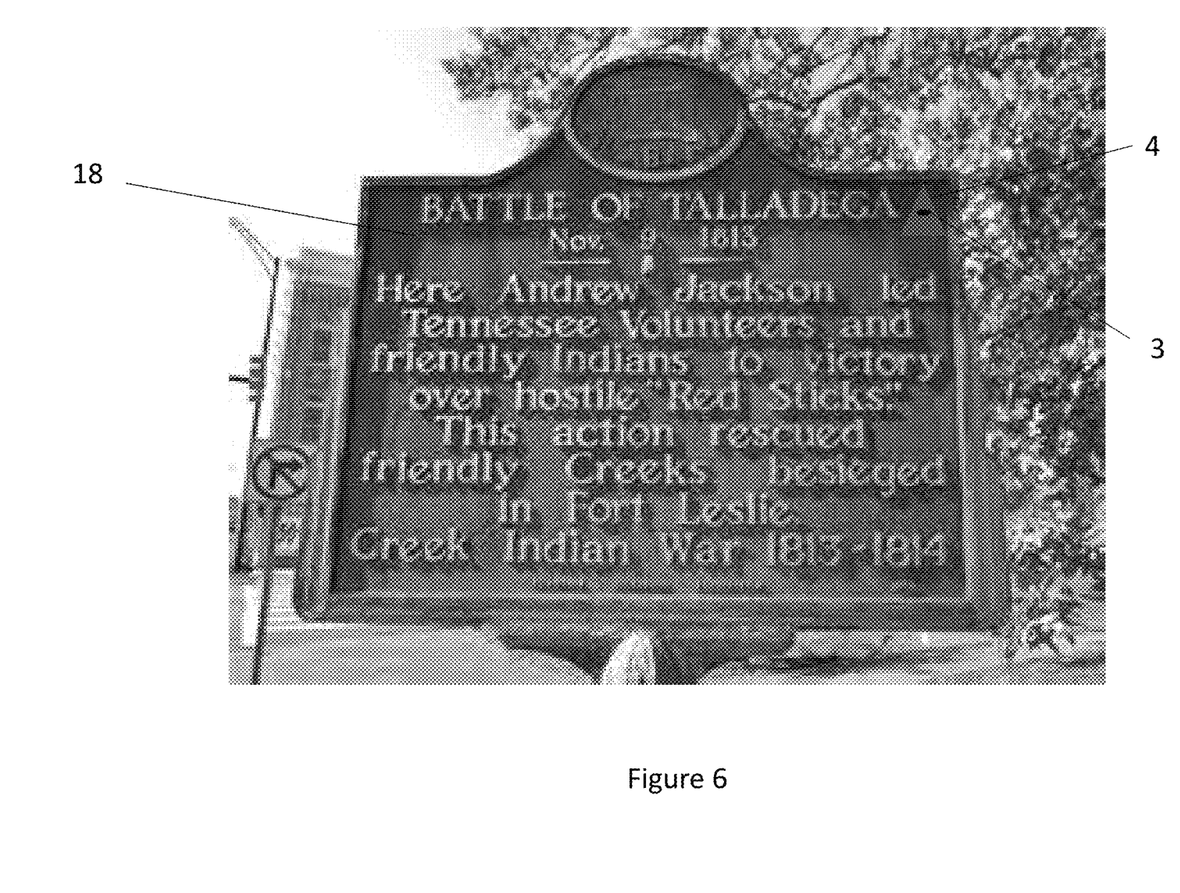
FIG. 6 is a plan view of another exemplary physical object consistent with the present invention.
Figure 6B:
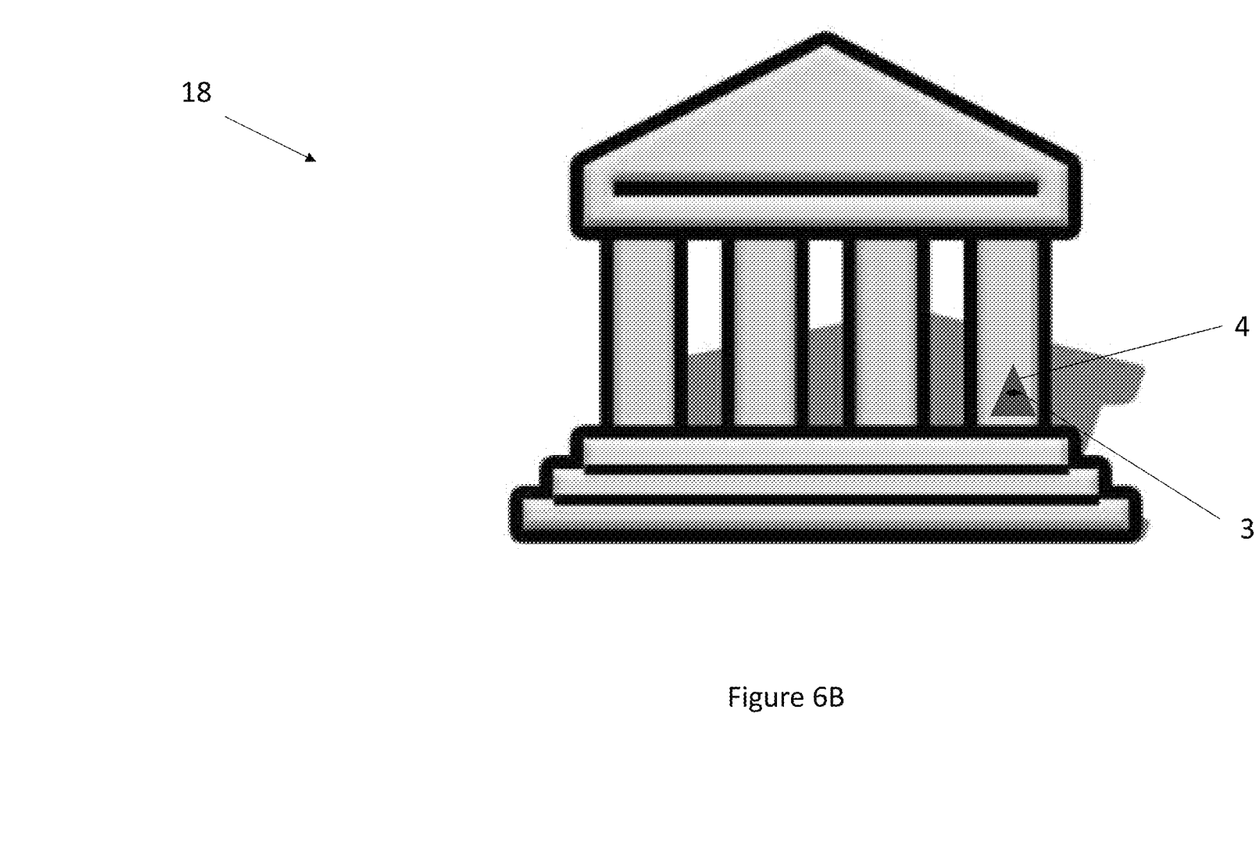
FIG. 6B is a plan view of another exemplary physical object consistent with the present invention.

FIG. 6 and FIG. 6B illustrates another exemplary embodiment of the coded icon 4. The icon 4 may further comprise the electronic component 3, though such is not required. The coded icon 4 may be a purple triangle (though such is not required) and it may be located on or near a physical object 18 such as, but not limited to, a historical landmark sign or a building. The coded icon 4 may comprise the electronic component 3, and the electronic component 3 may be configured to transmit location data as well as an audio recording. The location data may be transmitted such that the user 6 can easily located the sign and thus the associated landmark. The electronic component 3 may also transmit an audio recording that the user 6 can access using the app 14. The audio recording may provide an audio recording of the sign as well as, or in addition to, additional information about the landmark. For example, but not to serve as a limitation, the coded icon 4 could be used as part of a walking tour of an area such that the user 6 may locate several places of interest and learn more about them. For example, without limitation, the location data and audio clip may be transmitted via wireless or wired communication to the personal electronic device 8. Alternatively, the electronic component 3 may instead transmit data that prompts the app 14 to retrieve associated location data or other information (such as but not limited to the audio clip) from the remote server 5.

Those having skill in the arts will recognize that these use cases are merely exemplary and are not intended to by limiting. The present invention may be utilized with any kind of physical media and linked to any digital media.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for enhancing marketing efforts comprising:
a plurality of advertising media objects of various type;
a plurality of geotagged coded icons, each located on a respective one of the plurality of advertising media objects in a visible fashion as a non-interactive marker, and each color coded such that a particular color corresponds to a particular type of advertising media object;
a remotely located server configured to store data associated with each of the plurality of geotagged coded icons; and
a personal electronic device in wireless communication with the remotely located server and comprising executable software instructions, which when executed, configure the personal electronic device to:
display representations of at least some of the plurality of geotagged coded icons on a digital rendering of a map, wherein the representations are displayed at locations on the map corresponding to the actual location of the respective geotagged coded icon in a color matching the color of the respective geotagged coded icon;
receive user input regarding a particular color of the geotagged coded icons corresponding to a particular type of advertising media object;
selectively filter the displayed representations by color according to the received user input;
receive a user selection of a particular representation
retrieve the data associated with the selected representation; and
display the retrieved data.

2. The system of claim 1 further comprising:
an electronic component associated with each of the geotagged coded icons, wherein the electronic component is configured to store global positioning data regarding the location of the geotagged coded icon.

3. The system of claim 1 further comprising
additional executable software instructions at the personal electronic device, which when executed, configure the personal electronic device to;
retrieve the approximate current location of the personal electronic device: and
mark the approximate current location of the personal electronic device on the respective location on the map.

4. The system of claim 1 wherein:
the plurality of advertising media objects comprises billboards.

5. The system of claim 1 wherein:
the plurality of advertising media objects comprises for sale signs.

6. The system of claim 1 wherein:
the plurality of advertising media objects comprises storefront signage; and the data associated with the user selected representation comprises an advertising message and a coupon for the store associated with the storefront signage.

7. The system of claim 1 wherein:
the plurality of advertising media objects comprises historical landmark signs.

8. The system of claim 1 wherein:
the data comprises an audio recording; and
the executable software instructions are further configured to cause the personal electronic device to play the audio recording.

9. The system of claim 1 wherein:
the data comprises a video; and
the executable software instructions are further configured to cause the personal electronic device to display the video.

10. The system of claim 1 wherein:
the plurality of geotagged coded icons are coded by shape, wherein a particular shape corresponds to a particular category of advertising media objects;
the executable software instructions are configured to display the representations by shape; and
the executable software instructions are configured to selectively filter the displayed representations by shape.

11. A method for enhancing marketing efforts comprising the steps of:
placing a coded icon on each of a plurality of physical objects of various type in a visible fashion as a non-interactive marker, wherein said coded icons are color coded to correspond with a particular type of said physical objects;
associating each the coded icons with location data;
associating each of the coded icons with information data regarding the respective physical object the coded icon is placed on;
retrieving a user's current location;
retrieving the location data for coded icons within a predetermined distance of the user's current location;
generating a display on a portable electronic device comprising a rendering of a map overlaid with representations of the coded icons for which the location data was retrieved at their respective locations on the map, wherein the map corresponds to the predetermined distance from the user's current location, and wherein the coded icons are displayed in colors matching the color of the respective coded icon;
receiving a user selection of a particular color of coded icon;
filtering the coded icon representations by the user selected color such that only the coded icon representations matching the user selected color remain displayed;
receiving a user selection of a particular coded icon representation;
retrieving the information data associated with the user selected coded icon representation; and
providing the retrieved information data at the portable electronic device.

12. The method of claim 11 wherein:
the location data and the information data are stored on a remote server.

13. The method of claim 11 wherein:
the location data and the information data associated with each coded icon is digitally stored with a corresponding electronic component located on or in close proximity with the respective coded icon.

14. The method of claim 11 wherein:
the user's current location is retrieved upon receipt of a voice input; and
the user selection is received from a second voice input.

* * * * *